United States Patent [19]

Hemborg et al.

[11] 4,103,605
[45] Aug. 1, 1978

[54] MEATBALL COOKER

[75] Inventors: Göeran Hemborg, Aengelholm; Winje Green, Helsingborg, both of Sweden; Nils Lang-ree, Los Altos; Edward D. Baker, San Francisco, both of Calif.

[73] Assignee: N.P.I. Corporation, Burlingame, Calif.

[21] Appl. No.: 760,162

[22] Filed: Jan. 17, 1977

[51] Int. Cl.² .......................................... A47J 37/00
[52] U.S. Cl. ................................ 99/345; 99/348; 99/407; 99/423; 99/440; 99/443 C; 165/88; 198/658
[58] Field of Search ................ 165/88; 198/658; 99/345, 348, 404, 443 C, 443 R, 407, 408, 409, 423, 427, 440, 441; 259/3, 176, 177

[56] References Cited

U.S. PATENT DOCUMENTS

| 690,005 | 12/1901 | Anderson | 99/404 |
|---|---|---|---|
| 708,845 | 9/1902 | Turner | 165/88 |
| 1,330,219 | 2/1920 | Rockwell | 198/658 |
| 1,766,445 | 6/1930 | McKay | 99/443 R |
| 2,299,080 | 10/1942 | De Back | 99/404 |
| 2,427,388 | 9/1947 | Curran | 99/443 C |
| 2,939,383 | 6/1960 | Kanaga | 99/427 |
| 3,163,929 | 1/1965 | Goodstein | 99/443 C |
| 3,556,498 | 1/1971 | Sheahan | 198/658 |
| 3,558,108 | 1/1971 | Jackson | 259/177 |
| 3,616,747 | 11/1971 | Lapeyre | 99/407 |

FOREIGN PATENT DOCUMENTS 2,247,122 3/1974 Fed. Rep. of Germany ............. 99/407

Primary Examiner—Billy J. Wilhite
Attorney, Agent, or Firm—Lothrop & West

[57] ABSTRACT

A device for cooking meatballs has a frame supporting an open-ended drum for rotation on the frame about a substantially horizontal axis. The drum is open at both its inlet end and its outlet end and has for part of its length an outer wall together with the inner wall forming a jacket. Heating oil is brought into the jacket through an axial rotary joint and discharged from the jacket through a similar axial rotary joint. Within the drum is a plurality of helical fins spaced apart circumferentially. The fins are of a sufficient height to propel axially of the drum meatballs introduced thereto through the inlet end and to carry the meatballs to the outlet end for discharge therethrough. Extending axially a short distance away from the inner wall and preferably carried by adjacent portions of the fins are tumbling bars. These are effective to lift and release the meatballs. There is a cooking oil or oleomargarine liquid spray extending into the inlet end of the drum, and there is an outlet releasing the oleomargarine at the outlet of the drum for recirculation.

4 Claims, 3 Drawing Figures

MEATBALL COOKER

BRIEF SUMMARY OF THE INVENTION

A rotary drum heated by hot oil revolves about a generally horizontal axis and receives meatballs for cooking at an inlet end. The meatballs are propelled in contact, generally, with the hot interior wall of the drum by one or more helical fins extending from one end of the drum to the other. The cooked meatballs are discharged at the outlet end. There are tumbling bars extending axially near the inner wall of the drum in order to lift, tumble and drop or dislodge the meatballs. There is a cooking oil or oleomargarine spray into the interior of the drum near the inlet end thereof.

DETAILED DESCRIPTION

Figure 1:
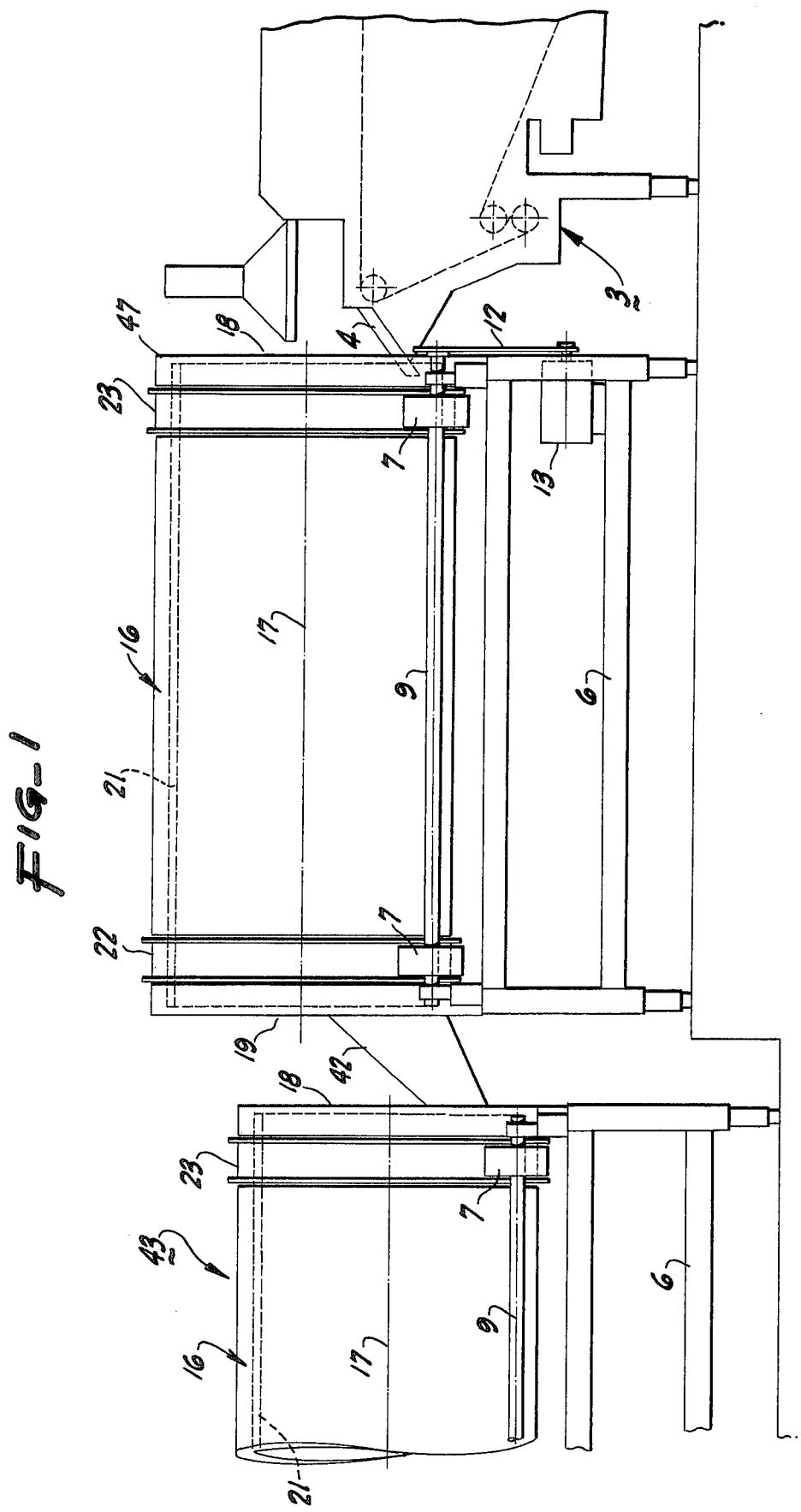
FIG. 1 is a side elevation of a meatball cooker pursuant to the invention shown as it is arranged with adjacent machines for furnishing the cooker with meatballs and for receiving cooked meatballs from the cooker.
Figure 2:
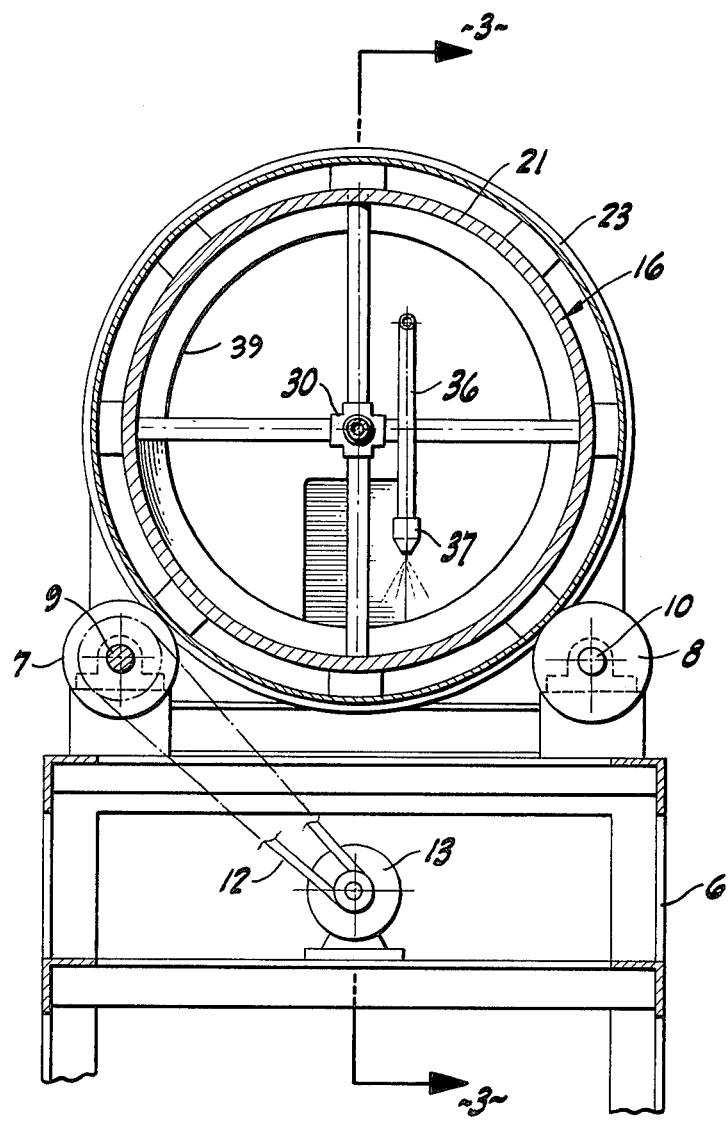
FIG. 2 is a cross-section, the plane of which is indicated by the line 2—2 of FIG. 3, certain portions of the figure being broken away to reduce its size and to show its interior construction.
Figure 3:
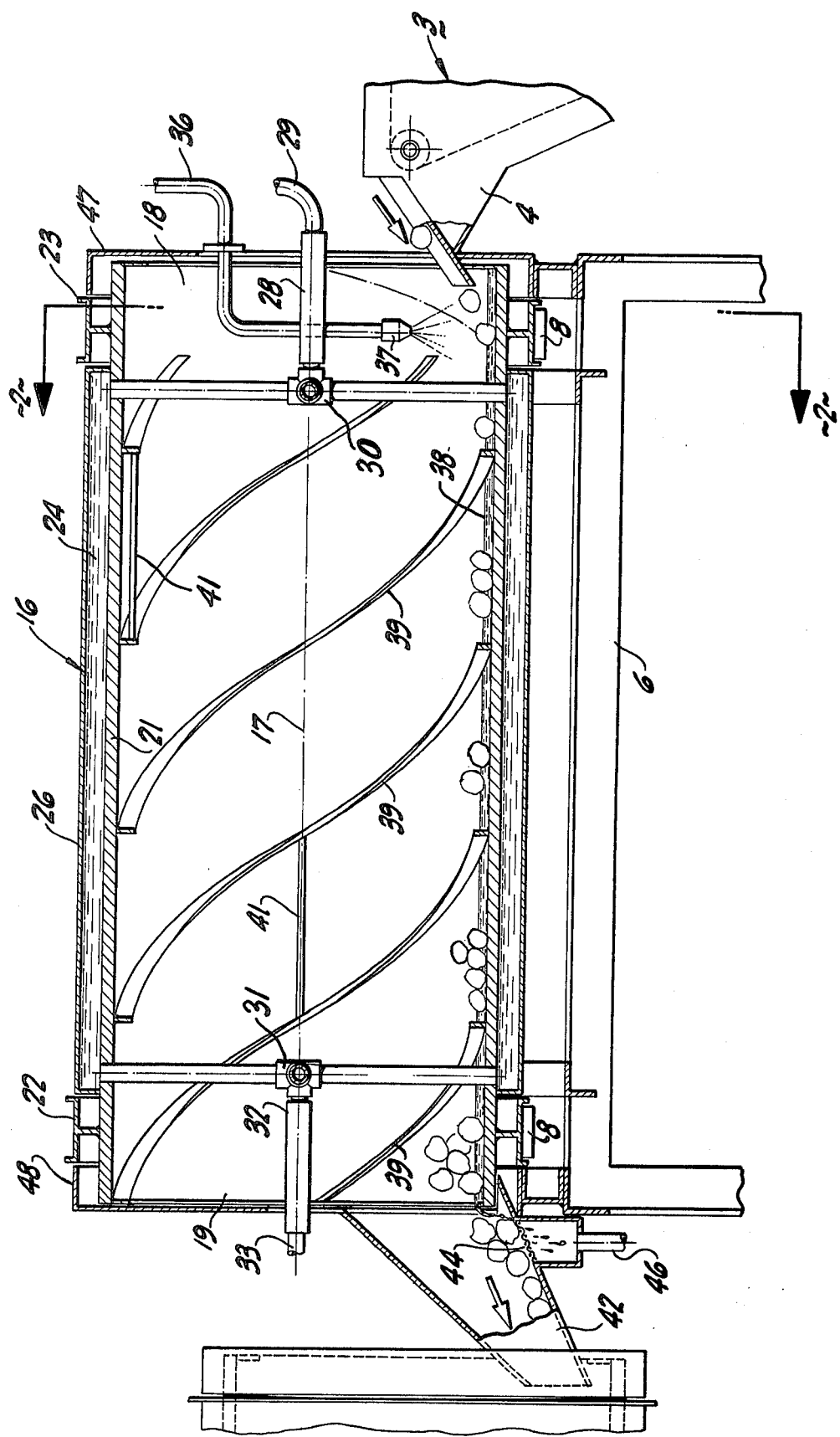
FIG. 3 is a longitudinal cross-section of a vertical plane as indicated by the line 3—3 of FIG. 2.

The present meatball cooker is capable of cooking the meatballs completely or partially and in the present instance is particularly utilized in connection with a machine 3 arranged at least to prepare the meatballs and preferably to cook them at least in a preliminary way and to supply meatballs available for further processing at an outlet location 4.

Our meatball cooker includes a framework 6 that carries a number of supporting rollers 7 and 8 arranged on shafts 9 and 10. The shaft 9 is preferably connected by a driving mechanism 12 to a driving motor 13.

Mounted on the various rollers 7 and 8 is a cooking drum 16 having its axis 17 disposed in a generally horizontal or slightly downwardly inclined position. The drum is largely open at its inlet end 18 and at its outlet end 19. The drum includes an inner wall 21 joined to a supporting rim 22 near one end and a supporting rim 23 near the other end. The rims 22 and 23 are in engagement with the rollers 7 and 8. When the motor 13 is energized the drum is correspondingly rotated about the axis 17.

A portion of the inner wall 21 not occupied by the rims 22 and 23 is surrounded by a fluid jacket 24 substantially enclosed by an outer wall 26. Disposed on the axis 17 is a rotary joint 28 having a connection 29 to a supply of hot oil. The oil is transferred from the joint 28 through a spider 30 to the interior of the jacket 24, the hottest oil coming in adjacent the inlet end.

From the jacket 24 there is a spider 31 leading through a rotary joint 32 on the axis 17 to a return line 33, so the cooler oil leaves through the outlet end. The oil can be recirculated and reheated by standard pumping and heating means not shown. The effect is to provide an inner wall 21 in the drum that is at an elevated temperature, a temperature sufficient to cook and even to brown the outside of meatballs.

The meatballs come in through the inlet end of the drum and fall to the bottom thereof in engagement with the inner wall 21. In that initial position the meatballs are supplied with cooking oil such as melted oleomargarine through a pipe 36 ending in a spray nozzle 37. The meatballs are promptly coated with cooking oil and any surplus falls into a pool 38 adjacent the bottom of the rotating drum.

In order to advance the meatballs through the drum in contact with the inner wall 21 as they are being heated and cooked, there are arranged continuous helical fins 39 extending from substantially the inlet end of the drum nearly or entirely to the outlet end thereof. Preferably there are four such fins evenly spaced apart circumferentially and extending radially inward from an attachment to the inner wall of the drum so that the fins rotate therewith. The fins are of a height about half the diameter or slightly more than half the diameter of the meatballs. In the event many meatballs arrive in any one vicinity some of them can tumble over the helical walls, but in general for meatballs in immediate contact with the inner wall 21 the meatballs are moved axially. There is sufficient friction between the meatballs and the inner wall so that some of the meatballs tend to climb up the drum inner wall as the drum rotates.

To afford some tumbling action of such balls, there are provided at various intervals a short distance away from the inner wall a number of tumbling bars 41. These extend axially between portions of successive helical fins. The bars 41 tend to run under any meatballs clustered near the bottom of the drum and tend to carry such meatballs up the increasingly steep side wall far enough so that the meatballs tumble by gravity over the bars and then fall back against the interior surface of the drum.

This is highly advantageous as it gives a random shape to the meatballs due to various random impacts thereof with the bars and with the inner wall of the drum. There has been some consumer reluctance to accept completely uniform, almost truly spherical, meatballs made by previous devices. The tumbled, somewhat irregular balls are cooked as they travel or advance axially through the drum and finally are discharged through the outlet end into a trough 42.

If the meatballs have been sufficiently cooked in this device, they are then ready for packaging and the like, but in some instances it is desired to run the meatballs into a second, duplicate machine 43 so that about half the finish cooking is done in the described device and the remaining finish cooking is done in the second device 43. The speed of the machine or machines and their general effects including temperature differences, if any, depend largely on the quantity of product being put through them and the particular composition or mix of the product.

The drum 16 at its outlet end spills out the finished or partially finished meatballs, and some or any excess of the cooking oil such as margarine is discharged therewith and passes through a strainer 44 into a return pipe 46. The cooking oil can then be recirculated to the nozzle 37. It is preferred that both ends of the machine be largely closed by removable covers 47 and 48 which have openings therein for the various instrumentalities and which can easily be removed for inspection of the interior of the drum and for cleaning thereof.

We claim:

1. A meatball cooker comprising a frame, an open-ended drum having a solid inner wall concentric with an axis and having an axial inlet opening to the atmosphere at one end and an axial outlet opening to the atmosphere at the other end, means for mounting said drum on said frame for rotation about said axis in substantially a horizontal position, an outer wall on said drum and with said inner wall defining a jacket, means for supplying said jacket with heating fluid, means for releasing heating fluid from said jacket, means for supplying meatballs through said inlet opening to said drum, means for supplying cooking oil through said inlet opening to said drum, helical fins on said inner wall adapted to propel said meatballs and said cooking oil together along the bottom of said inner wall and through said drum from said inlet opening to and through said outlet opening.

2. A device as in claim 1 including means on said frame adjacent said outlet opening for receiving meatballs and cooking oil from within said drum and for separating said cooking oil from said meatballs.

3. A device as in claim 1 including a plurality of tumbling bars spaced from said inner wall and extending axially between adjacent ones of said fins.

4. A device as in claim 1 in which said means for supplying cooking oil is a spray within said drum adjacent the inlet thereof.

* * * * *